United States Patent [19]
Ratti

[11] 4,359,163
[45] Nov. 16, 1982

[54] BUSHING FOR THE HOLDING OF TOOLS, SPINDLES OR LIKE PARTS, PARTICULARLY FOR THE USE IN SUPPORTING UNITS IN COMBINATION WITH NUMERICAL CONTROL MACHINES

[75] Inventor: Mario Ratti, Milan, Italy
[73] Assignee: S.U.S.T.A. S.p.A., Milan, Italy
[21] Appl. No.: 30,875
[22] Filed: Apr. 17, 1979

[30] Foreign Application Priority Data
Apr. 17, 1978 [IT] Italy .............................. 22380 A/78

[51] Int. Cl.$^3$ .............................................. A47F 7/00
[52] U.S. Cl. ................................................ 211/60 T
[58] Field of Search ................... 211/60 T, 60 R, 1.5, 211/69, 69.5; 248/678, 679, 316 A

[56] References Cited
U.S. PATENT DOCUMENTS

| | | | |
|---|---|---|---|
| 2,150,802 | 3/1939 | Latsch | 211/60 T UX |
| 4,117,937 | 10/1978 | Ratti | 211/60 T |
| 4,155,460 | 5/1979 | Ratti | 211/60 T |

FOREIGN PATENT DOCUMENTS 2619151 11/1977 Fed. Rep. of Germany .... 211/60 T

*Primary Examiner*—Ramon S. Britts
*Assistant Examiner*—Robert W. Gibson, Jr.
*Attorney, Agent, or Firm*—Wenderoth, Lind & Ponack

[57] ABSTRACT

A bushing for retaining and supporting at least one tool, spindle or the like includes at least two component parts which are constructed to together define therebetween an insertion seat for receiving a particularly tool, spindle or the like. The parts are adjustably movable with respect to each other between a plurality of differently spaced positions, to thereby adjust the size of the insertion seat as a function of the size of the particular tool, spindle or the like to be received therein. The parts each have retaining devices for matingly engaging each other in each of the plurality of positions, and for thereby fixing the relative spacing between the parts and the size of the insertion seat at each of the plurality of positions.

12 Claims, 7 Drawing Figures

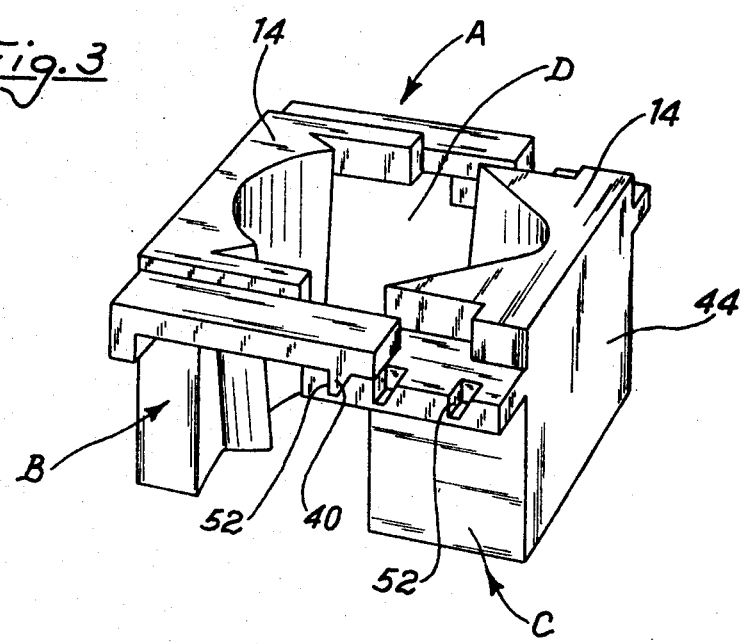
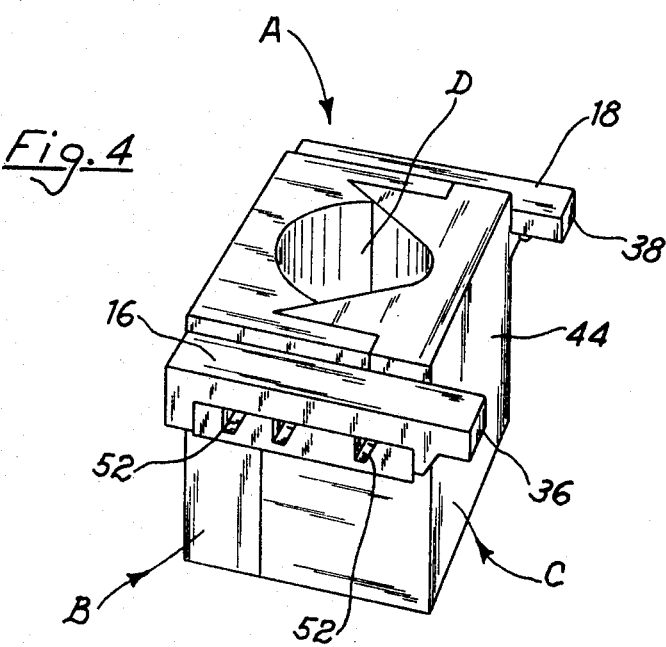

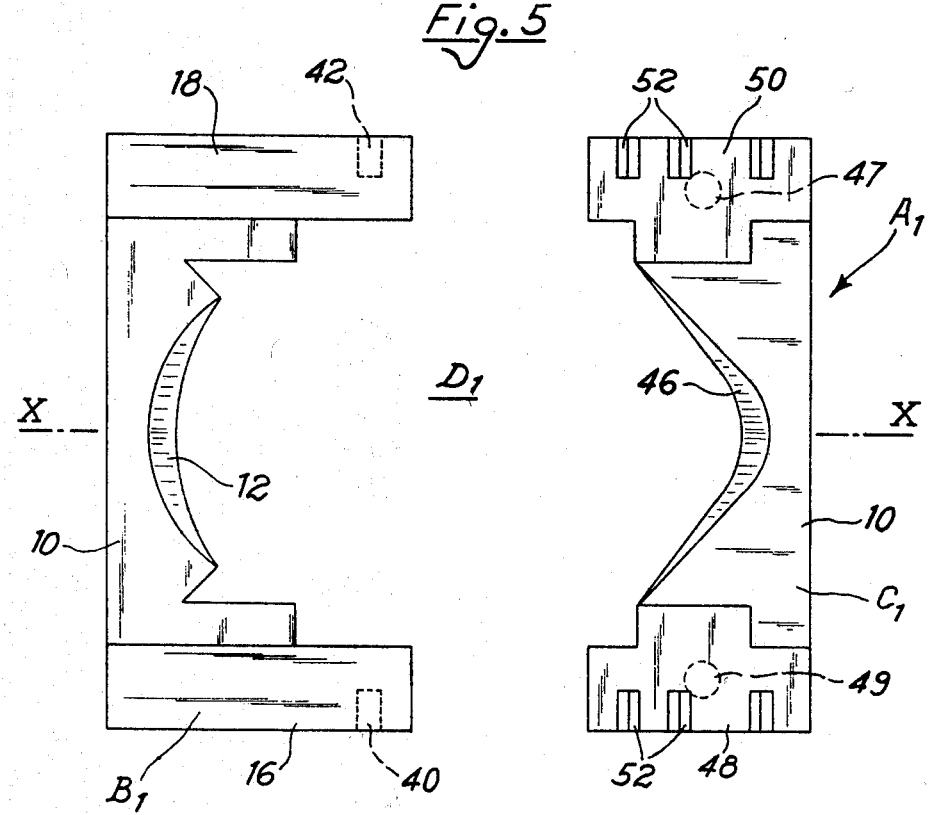
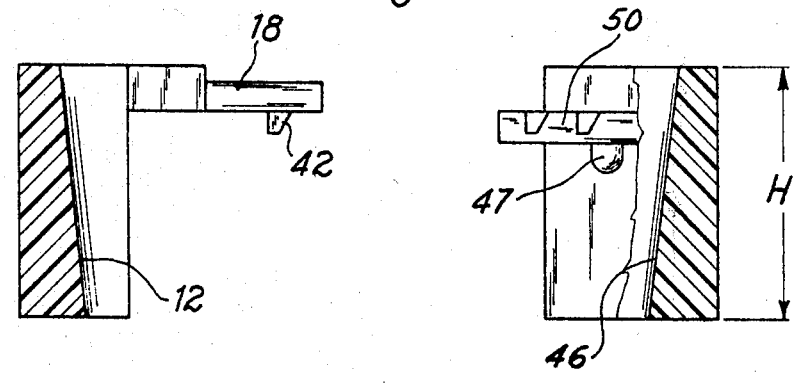

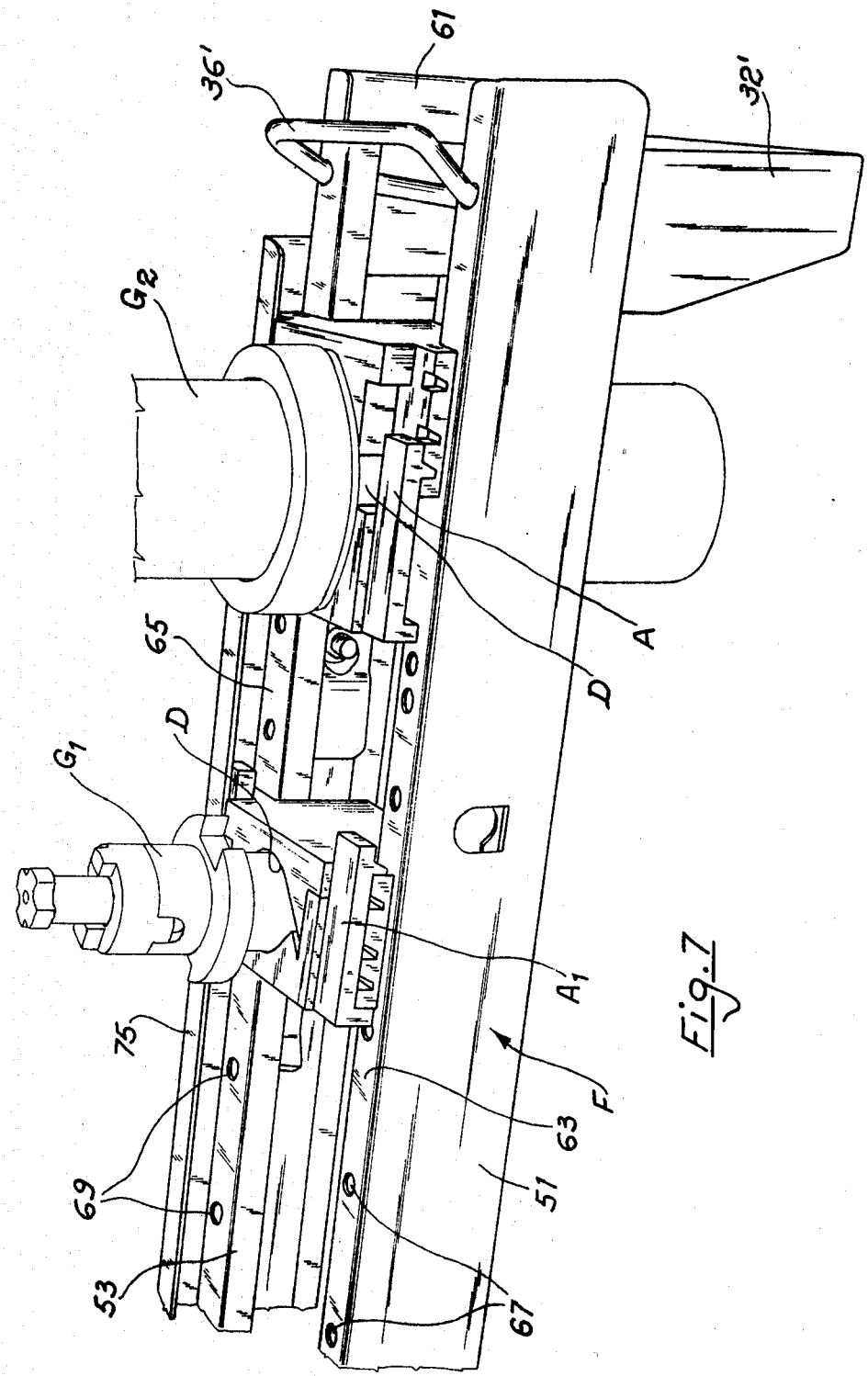

BUSHING FOR THE HOLDING OF TOOLS, SPINDLES OR LIKE PARTS, PARTICULARLY FOR THE USE IN SUPPORTING UNITS IN COMBINATION WITH NUMERICAL CONTROL MACHINES

BACKGROUND OF THE INVENTION

This invention relates to a bushing for receiving tools, spindles and the like, in particular to be used in supporting units in combination with numerically control machines.

There are known tapered bushings to be fixed in supporting elements, and fixed again in a removable manner to retaining structure, for example metal carriages, so as to obtain particularly adapted units for servicing numerically control machines. Each support has a certain number of bushings, all of the same size or of different sizes, so that each bushing can receive a given tool, spindle or other operating element which can be removed from the bushing and inserted as required into the machine tool.

These known bushings offer remarkable advantages as regards the controllability, order and speed in handling the tools kept by the units and the possibility of removing them from the bushing and returning them thereto.

Nevertheless, there are still some problems regarding the availability of a high number of bushings or the possibility of the safe locking of the pieces to be kept by the bushings in view of the variability of size and form of these pieces.

SUMMARY OF THE INVENTION

The object of the present invention is to obviate the above and other drawbacks by the provision of a bushing or similar device designed to retain at least one tool, spindle or other mechanical device, especially usable in holding units in combination with numerical machines, opportunely designed for being used with and locked to relative retaining structure which, in turn are designed to be fixed in an orderly manner and appropriate position to the frame of a group. The bushing is formed of at least two parts capable of forming easily and securely a seat for receiving the tool or the like. The seat thus is of an adjustable size as a function of the size of the tool to be inserted therein, depending upon the reciprocal position conferred to the parts constituting the bushing. The reciprocal position of the bushing is fixed either by means of supplementary components belonging to the constituting parts thereof, or by corresponding parts of the retaining structure, in such a manner that it is possible to choose and lock the seat intended to receive the tool by dimensioning it according to the size of the tool itself to be inserted into the bushing and in particular according to the width and height of the tool or the like.

The thus-defined fundamental concept of this invention allows the greatest number of different constructional variations both as regards the system and way it is used for obtaining the variation of the size of the seat for the tool to be inserted into the bushing, and the structure and constitution of the parts forming the same, and finally as regards the material of which the bushing is made, material which may be for example a plastic, or light metal alloy, such as an aluminium alloy or any other suitable material.

According to a preferred embodiment of this invention, the bushing is formed of two complementary parts matingly joined to each other, so as to confer to the bushing a substantially box-like structure, parallelepiped or similar in shape, with the variability of the size of the seat of the bushing, and thereby of the bushing itself, preferably acting along a direction perpendicular to the axis of the seat, by the reciprocal moving together or spacing apart of the two parts which are then fixed in the chosen reciprocal position, thus defining the chosen size for the seat intended to receive the tool, the moving together of the two parts thus reducing the size of the seat and their moving apart increasing such size.

The reciprocal clamping of the parts forming the bushing in the position chosen for ensuring the desired size of the seat can be obtained by the presence of parts enabling the accurate adjustment of the moving together or apart of the parts, or by a stepwise adjustment.

If the adjustment of the reciprocal position of the two parts forming the bushing is of the stepped type, each of the parts comprises a pair of parallel side wings which join each other, if possible telescopically insertable the one into the other, or, preferably, one pair in the form of suitable, toothed elements and the other pair in the form of suitable and corresponding spaced parts designed for receiving the toothed elements, determining in this way the spacing between the parts forming the bushing and therewith the size of the seat of insertion. The pairs of wings are near the level of the end of the seat intended to receive the tool, and advantageously near the level of the end of the throat of the same.

The surfaces of the seat of insertion, of a variable size, may be made so as to be the best adapted for the purpose of retaining the tool. For example, the generatrices of these surface may be perpendicular to the end of the throat and outlet of the seats, or they may be inclined with respect thereto. In the first case, the seat will be cylindrical, in the second case its shape will be tapered, with the vertex of the cone being obviously turned toward the outlet side of the seat.

BRIEF DESCRIPTION OF THE DRAWINGS

These and other properties of the invention will be apparent from the following description with reference to the accompanying drawings, given purely by way of example and without limiting the scope of the invention, and wherein:

FIG. 3 is a perspective view similar to FIG. 1, but with the parts forming the bushing being connected by the matching of relative complementary clamping elements, giving in this case the maximum size of the seat;

FIG. 4 is a perspective view similar to FIG. 3, but with the clamping elements at a minimum distance and with the seat being as small as possible;

FIG. 5 is a top plan view of a bushing similar to the preceding one, with the single parts being separated, but with the generatrices of the locking surfaces being inclined to form a tapered seat;

FIG. 6 is a vertical section through the bushing of FIG. 5 taken along line X—X thereof; and FIG. 7 is a perspective view of two bushings according to this invention complete with a supporting device enabling them to be retained by carriage or the like, in combination, for example with a numerical control machine.

DETAILED DESCRIPTION OF THE INVENTION

Figure 1:
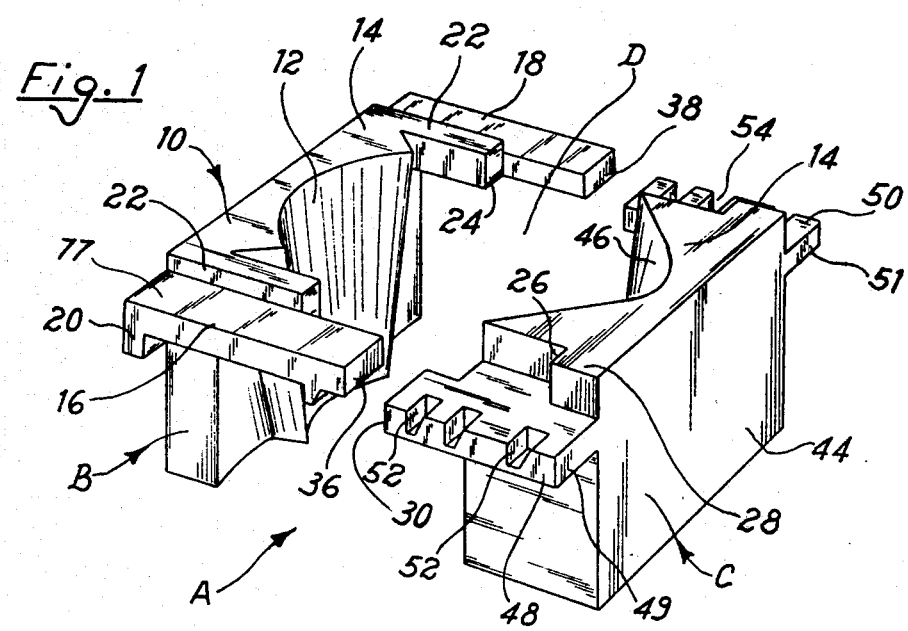
FIG. 1 is a perspective view of a composite bushing according to the invention, in this case formed of only two mating parts with only one seat of insertion of cylindrical configuration, the parts being shown separated.
Figure 2:
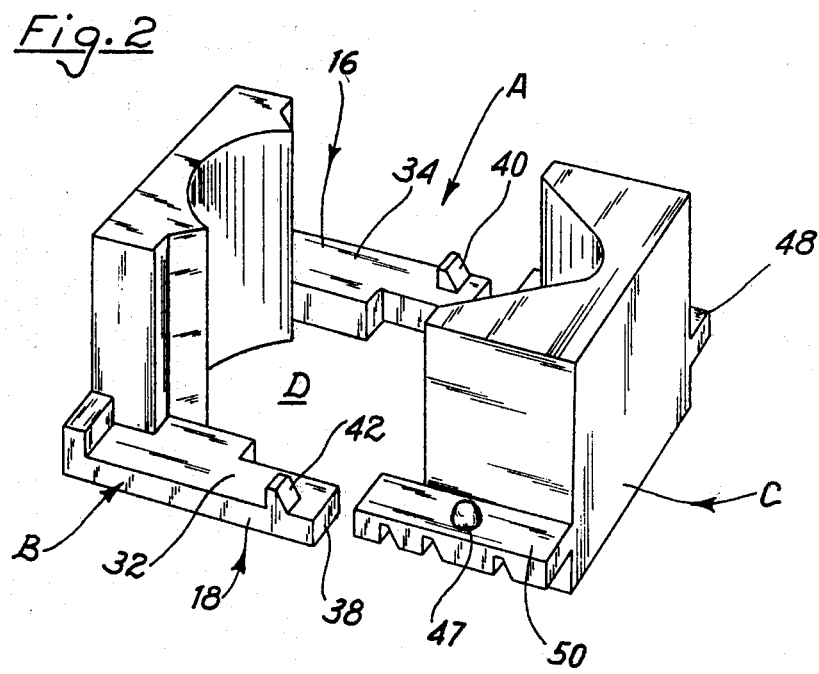
FIG. 2 is a perspective view of the embodiment shown in FIG. 1, but with the bushing being turned through 180°.

Referring now to the drawings and in particular to FIGS. 1 to 4, a compound bushing A is formed in this case of two parts B,C for forming a seat of insertion D of a variable size according to the size of a tool, spindle or the like, to be retained by the bushing.

As already mentioned, the material for making the bushing A, that is the parts B,C may be the most opportune, preferable a moulded plastic or light metal alloy, for example an aluminum alloy, it being still further understood that the bushing A, instead of one seat of insertion D, may form two or more seats of insertion for as many tools, spindles or the like.

The part B comprises a vertically shaped member 10 having an inner retaining surface 12 whose generatrices extend vertically, that is perpendicular to the upper end or surface 14 of the bushing, at the level of the inlet opening of the seat of insertion D.

Laterally, and adjacent end 14, the part B is provided with a pair of parallel wings 16, 18, which are similarly shaped and which are integral with opposite sides of the member 10.

Each wing is provided at the rear with a locator ridge 22 having a front surface 24 which acts as an abutment for a corresponding surface 26 of a locator 28 of part C, and with a locator block 20 which engages with a surface 30 of the part C when the parts B,C are in their closest position (FIG. 4), so that the seat D in this case has its smallest size. As it can be seen in particular in FIGS. 2, 3 and 4, the undersurfaces 32, 34 of the wings 18, 16 possess (adjacent their front ends 36, 38) saw-like teeth 40, 42, each with a surface perpendicular to the wings and another surface inclined toward the rear block 20.

Referring now to the part C opposite to part B, part C also has a vertically shaped main member 44 which has an inner retaining surface 46 whose generatrices are vertical like those of surface 12, with the transverse section of the surface 46 being more curved than that of the surface 12.

Parallel side wings 48, 50 are adjacent to the end 14, but are slightly lower than the wings 16, 18 so that the latter can conjugate with the wings 48, 50 as shown in FIGS. 3 and 4 to ensure the reciprocal clamping of the parts B,C to form the desired bushing A.

Each of the wings 48, 50 has a plurality of recesses 52, 54, in this case three recesses for each wing, perfectly interaligned, with each recess being complementary in shape to the respective teeth 40, 42 to allow the teeth to enter into the recesses to form the bushing according to the dimension it is intended to give to the seat D for retaining one tool in preference to another.

The sizes, that is the dimensions of the parts B,C of the bushing A and also of the bushing itself, are to be selected according to the maximum and minimum dimensions the bushing is to possess corresponding to the reciprocal maximum and minimum positions of the the parts and hence the maximum and minimum dimensions of the seat of insertion D of the bushing. While taking as essential the concept of the variability of the size of the seat D, the structure and the form as well as the dimensions of the parts forming the bushing, which may be also more than two, may be modified in any opportune manner. For example, the fixing or clamping elements, instead of consisting of the teeth 40, 42 and the respective recesses 52 54, may consist. For example, of screw elements; for example, the Part B may have a pair of lateral screws and respective threaded seats parallel to the end 14, while the part C may have a pair of threaded holes in line with the screws of the part B, so that, when pairing the screws with holes and tightening or unscrewing the screws, the parts B, C will be moved together or apart as required for decreasing or increasing the seat D. In this way, instead of having a stepped adjustment of the seat D, this adjustment will be progressive and still more accurate.

It is preferable, in any case, to have the adjustment of the seat of insertion D in one direction only and precisely in a direction perpendicular to the axis of the seat. It is, however, not excluded that the adjustment, especially when more than two parts are used to form the seat, may be made in more than one direction, for example like a "photographic shutter".

Referring now to FIGS. 3 and 4, it is seen that, when the teeth 40, 42 have entered the first pair of aligned recesses 52, 54 the edge 14 is at the upper end of the inlet of the seat of insertion D while the bushing has a shape corresponding to the maximum extension, with the seat at its maximum size, capable of receiving and retaining a like tool, spindle or the like of a size compatible with the size of the seat.

FIG. 4 shows the same bushing illustrated in FIG. 3, but at its minimum size, the teeth 40, 42 now engaging the rear surfaces 49 and 51 of the wings 48, 50 of the part C, so that the congruent male zones of the part C have entered the corresponding female zones of the part B. In this way, the bushing a has assumed its smallest size with the seat of insertion D having its minimum dimension, capable to receiving a corresponding tool of a size corresponding to that of a tool reduced in size when compared to that of FIG. 3, or of intermediate sizes, that is between the maximum and minimum sizes.

With reference to FIGS. 5 and 6, representing a variant of the bushing A, the bushing is now indicated by $A_1$, and includes component parts $B_1$, $C_1$ equal to B and C, with vertical members 10 and with $B_1$ having wings 16, 18 with 40, 42, while the wings 48, 50 of part $C_1$ have the recesses 52.

In this embodiment, the surfaces 12, 46 forming the seat of insertion $D_1$ are tapered with a vertex facing downwardly, and with the generatrices of these surfaces downwardly inclined inwardly of the seat $D_1$, so that the seat has a tapered form. Projecting prongs 47, 49 are integral with wings 50, 48 in the same manner as the wings of the bushing A of FIGS. 1 and 2, the prongs being employed for the exact positioning of the bushing along bars 51, 53 of a support F shown in FIG. 7 which is a component of a retaining unit for presenting different tools to be used with a machine, for example a numerical control machine.

Referring now to FIG. 7, the support F includes support legs 32' and lifting handles 36'. The unit includes the bars 51, 53 assembled by means of end cross pieces 61, the bars being made of angular sections having horizontal wings 63, 65 provided with holes 67, 69 opportunely spaced apart and aligned according to the pitch or gauge to be used for the various bushings A to be seated on the support F.

FIG. 7 shows two compound bushings A of the same type assembled on the support and spaced as required, it being understood that the support F can carry many more bushings depending on the length of the support and the size of the bushings.

The bushing $A_1$ at the left is at its smallest size and its seat of insertion D has the minimum dimension, with the bushing being of the taper seat type. It contains a tool $G_1$ which may be a spindle or any other tool.

The bushing A at the right is shown at its largest extension with the seat of insertion D being at its maximum dimension. The seat in this case is cylindrical, and the bushing securely retains a tool $G_2$ which may be a quick-coupling spindle, cylindrical in shape and rather heavy. In view of the height H of the compound bushing (see FIG. 6), it is evident that the tool, even though of a large size, is securely retained by the bushing, which is securely supported by the support F and the relative unit.

As regards the selection of the position of the bushing along the support F and the clamping of the bushing, the prongs 47, 49 are inserted into the corresponding holes 67, 69, thus defining the longitudinal position of the bushing. Subsequently, to the bars 51, 53 are locked or clamped angular bars 75, with FIG. 7 showing only one angular bar 75, and with the bars 75 being assembled with their horizontal wing fixed against the upper surfaces 77 of the wings 16, 18, thus firmly clamping the bushings in the chosen position.

Advantageously, in addition to the parts B, C preferable made of a plastic material, the compound bushing A may also include a pair of metal stiffeners, preferably formed of opportunely shaped metal plates and designed to be laterally fixed to the parts B, C and to render the bushing integral in the reciprocal positions chosen for the parts B, C, especially when these parts are spaced apart and the seat for receiving the tool assumes very large dimensions.

As already pointed out, the use, the advantages and the performance of the compound bushings according to the invention, are quite evident and can be summarized as follows.

According to the tool or pieces the compound bushing or bushings A are intended to retain, each bushing shall have the most appropriate size so that the relative seat of insertion D is sufficiently large for the tool to be inserted into the bushing and retained therein in the best and most secure manner, independently of the bushing being either provided with a cylindrical seat (A) or with a taper seat ($A_1$).

As already mentioned, the dimensional variability of the seat D is ensured, in the illustrated embodiments, by complementary elements for the adjustment and clamping which, when engaged, ensure the desired dimension. In the illustrated embodiment, there are four positions of reciprocal engagement between the elements, because there are three pairs of recesses 52, 54 as well as the possibility of engaging the teeth 40, 42 with the surfaces 49 and 51.

After having determined the width of the seat of insertion, the bushing is positioned in the exact zone of the support F by inserting the prongs 47 and 49 into the corresponding pair of holes 67 and 69 in the relative wings of the bars 51 and 53, and then assembling the counterbars 75 for locking, as already mentioned, with the bottom surfaces of the horizontal wings of bars 74 clamping the top surfaces of the wings 16 and 18 of the bushing part B, and in this manner the bush itself.

Among other advantages provided by the variability in size of the bushings, and thereby of the seat of insertion for the tool to be used with the bushing it is also important to consider the reduction of the number of bushings to be put at the operator's disposal as compared to the use of bushings made in a single piece as has been done until now. In fact, having the possibility, according to this invention, to have one bushing for retaining, one at the time, different tools of different dimensions (in the illustrated embodiment four tools), instead of having to use different enbloc bushings each having a different seat, according to the invention only one compound bushing with variable seat need be used for receiving, one after another, tools of different dimensions. It should also be noted that the box-like parallelepiped structure of the bushing with a relative by large vertical dimension H of the seat confers to the bushing itself a very secure retaining capacity.

In practice, the details of making and constructing these bushings may vary without thereby departing from the scope of the invention,

What we claim is:

1. A bushing for retaining and supporting at least one tool, spindle or the like, particularly for use with a support structure supporting a plurality of such tools to be used in a numerically controlled machine, said bushing comprising:
   two component parts together forming a box-like parallelepiped configuration and defining therebetween an insertion seat for receiving a particular tool, spindle or the like;
   said parts being adjustably movable toward and away from each other in opposite directions generally perpendicular to the axis of said insertion seat between a plurality of differently spaced positions, such that moving parts toward each other reduces the size of said insertion seat, and moving said parts away from each other increases the size of said insertion seat, to thereby adjust the size of said insertion seat as a function of the size of the particular tool, spindle or the like to be received therein; and
   said parts each having retaining means for matingly engaging each other in each of said plurality of positions, and for thereby fixing the relative spacing between said parts and the size of said insertion seat at each of said plurality of positions.

2. A bushing as claimed in claim 1, wherein said parts have inner surfaces which define said insertion seat.

3. A bushing as claimed in claim 1, wherein said retaining means of one of said parts includes means for engagement with a support structure and for thereby fixing the position of said bushing with respect to the support structure.

4. A bushing for retaining and supporting at least one tool, spindle or the like, particularly for use with a support structure supporting a plurality of such tools to be used in a numerically controlled machine, said bushing comprising:
   at least two component parts which are constructed to together define therebetween an insertion seat for receiving a particular tool, spindle or the like, each said part including a pair of lateral wings, said pair of wings of each said part extending therefrom in directions parallel to each other and toward the other said part;
   said parts being adjustably movable with respect to each other between a plurality of differently spaced positions, to thereby adjust the size of said insertion seat as a function of the size of the particular tool, spindle or the like to be received therein; and said parts each having a retaining means of matingly engaging each other in each of said plurality of positions, and for thereby fixing the relative spacing between said parts and the size of said insertion seat at each of said plurality of positions.

5. A bushing as claimed in claim 4, wherein said retaining means of a first said part comprises teeth projecting from said wings thereof, said retaining means of a second said part comprises a plurality of recesses in said wings thereof, and said recesses are shaped complementary to said teeth, such that at different of said plurality of positions said teeth are received in different of said recesses.

6. A bushing as claimed in claim 4, wherein said wings are positioned adjacent ends of said parts near the inlet of said insertion seat.

7. A bushing for retaining and supporting at least one tool, spindle or the like, particularly for use with a support structure supporting a plurality of such tools to be used in a numerically controlled machine, said bushing comprising:

at least two component parts which are constructed to together define therebetween an insertion seat for receiving a particular tool, spindle or the like;

said parts being adjustably movable with respect to each other between a plurality of differently spaced positions, to thereby adjust the size of said insertion seat as a function of the size of the particular tool, spindle or the like to be received therein;

said parts each having retaining means for matingly engaging each other in each of said plurality of positions, and for thereby fixing the relative spacing between said parts and the size of said insertion seat at each of said plurality of positions; and each said part comprising a primary element formed of plastic material, and shaped metal plates fixed laterally of said primary element, said retaining means including portions of said shaped metal plates hooking said parts together to form a substantially monolithic unit at each of said plurality of positions.

8. A bushing for retaining and supporting at least one tool, spindle or the like, particularly for use with a support structure supporting a plurality of such tools to be used in a numerically controlled machine, said bushing comprising:

at least two component parts which are constructed to together define therebetween an insertion seat for receiving a particular tool, spindle or the like, said parts having inner surfaces which define said insertion seat, which are each partially cylindrical and which are defined by generatrices extending parallel to each other and to the axis of said insertion seat;

said parts being adjustably movable with respect to each other between a plurality of differently spaced positions, to thereby adjust the size of said insertion seat as a function of the size of the particular tool, spindle or the like to be received therein; and said parts each having retaining means for matingly engaging each other in each of said plurality of positions, and for thereby fixing the relative spacing between said parts and the size of said insertion seat at each of said plurality of positions.

9. A bushing for retaining and supporting at least one tool, spindle or the like, particularly for use with a support structure supporting a plurality of such tools to be used in a numerically controlled machine, said bushing comprising:

at least two component parts which are constructed to together define therebetween an insertion seat for receiving a particular tool, spindle or the like, said parts having inner surfaces which define said insertion seat, which are tapered and converge in directions away from the inlet of said insertion seat and which are defined by generatrices which are inclined to each other and to the axis of said insertion seat;

said parts being adjustably movable with respect to each other between a plurality of differently spaced positions, to thereby adjust the size of said insertion seat as a function of the size of the particular tool, spindle or the like to be received therein; and said parts each having retaining means for matingly engaging each other in each of said plurality of positions, and for thereby fixing the relative spacing between said parts and the size of said insertion seat at each of said plurality of positions.

10. A bushing for retaining and supporting at least one tool, spindle or the like, particularly for use with a support structure supporting a plurality of such tools to be used in a numerically controlled machine, said bushing comprising:

at least two component parts which are constructed to together define therebetween an insertion seat for receiving a particular tool, spindle or the like;

said parts being adjustably movable with respect to each other between a plurality of differently spaced positions, to thereby adjust the size of said insertion seat as a function of the size of the particular tool, spindle or the like to be received therein; and said parts each having retaining means for matingly engaging each other in each of said plurality of positions, and for thereby fixing the relative spacing between said parts and the size of said insertion seat at each of said plurality of positions, said retaining means of one of said parts comprising projections extending from lateral wings of said one part for engagement with a support structure and for thereby fixing the position of said bushing with respect to the support structure.

11. A bushing for retaining and supporting at least one tool, spindle or the like, particularly for use with a support structure supporting a plurality of such tools to be used in a numerically controlled machine, said bushing comprising:

at least two component parts which are constructed to together define therebetween an insertion seat for receiving a particular tool, spindle or the like;

said parts being adjustably movable with respect to each other between a plurality of differently spaced positions, to thereby adjust the size of said insertion seat as a function of the size of the particular tool, spindle or the like to be received therein; and said parts each having retaining means for matingly engaging each other in each of said plurality of positions, and for thereby fixing the relative spacing between said parts and the size of said insertion seat at each of said plurality of positions, said retaining means of one of said parts including means for being clamped by a clamp device of a support structure to thus clamp said bushing in position with respect to the support structure.

12. A bushing as claimed in claim 11, wherein said means for being clamped comprises substantially planar surfaces formed on lateral wings of said one part.

* * * * *